C. C. REDMOND.
Water-Gages for Steam-Boilers.
No. 158,002.  Patented Dec. 22, 1874.
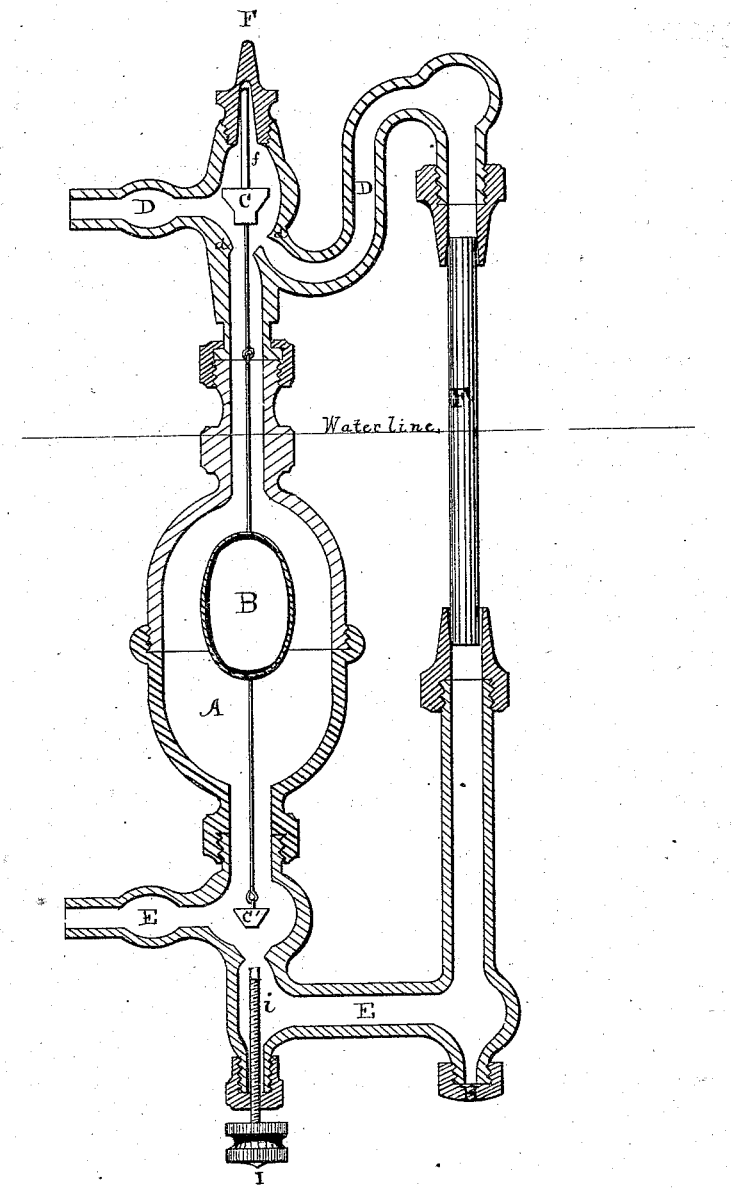
WITNESSES.
INVENTOR.
Chas. C. Redmond
per attys.
A. H. Evans & Co.

UNITED STATES PATENT OFFICE.

CHARLES C. REDMOND, OF SAN JOSÉ, CALIFORNIA, ASSIGNOR OF THREE-FOURTHS HIS RIGHT TO ELKANAH M. GIBSON AND HENRY S. LAMPKIN, OF SAME PLACE, AND ALEXANDER H. EVANS, OF WASHINGTON, D. C.

IMPROVEMENT IN WATER-GAGES FOR STEAM-BOILERS.

Specification forming part of Letters Patent No. 158,002, dated December 22, 1874; application filed November 19, 1874.

*To all whom it may concern:*

Be it known that I, CHARLES C. REDMOND, of San José, California, have invented a new and useful Improvement in Water-Gages, of which the following is a clear, full, and exact description, reference being had to the accompanying drawings making a part of this specification, in which the figure is the representation of a vertical section.

My invention relates to water-gages used in connection with steam-boilers; and it consists of a float in water-chamber, by which are controlled automatically the valves between the ends of the glass tube of the gage and its connection with the boiler, in such a manner that when the tube breaks the said valves close instantly and automatically, and the escape of the steam and water from the boiler is prevented.

In order to enable others skilled in the art to make and use my invention, I will proceed to describe the exact manner in which I have carried it out.

In the drawings, A represents the water-chamber, which contains the float B. The valves C C' are connected by a small rod with the float, so that action of the float controls the action of the valves. D is the steam-pipe, leading from the boiler to the upper end of the glass tube, and with the valve-seat d so constructed that when the valve C is allowed to fall, it will perfectly close the pipe D and shut off steam from the glass tube. The valve C is provided with a guide-rod, f, which extends vertically into the hollow cap F. The pipe E is a hot-water pipe, leading from the boiler into the lower end of the glass tube, and constructed with the valve-seat e, so arranged that, when the valve C' is allowed to fall into the seat e, the pipe is instantly closed, and the hot water is shut off from the glass tube F'.

It is evident from the above description of my invention that, as long as the glass tube remains intact, the float B will hold the valves C and C' in the position shown in the drawings; but in the event of the tube becoming broken or displaced, the first rush of the water toward the opening formed by the breaking of the tube will carry down the float, and with the float the valves C and C', to the valve-seats d and e, and instantly close the pipes B and E, and thus prevent the escape of either steam or water.

At the lower end of the gage I arrange the rod i, which is operated by the screw I. The object of this rod is to again raise the valve C' from its seat after the glass tube F' has been repaired or replaced by another, and allow the water to pass to the tube. The raising of the valve C' results in raising the float B and the valve C, so that the gage is again in operation. At the bottom of the stem holding the glass tube I place the cock J, through which to discharge any sediment which may collect in the tube or pipe.

Having thus described my invention, what I claim as new, and desire to secure by Letters Patent, is—

1. The valves C C' and connected float B, in combination with the pipes D E and glass tube F', substantially as and for the purpose set forth.

2. The float B and connected valves C C', in combination with the rod i and screw I, constructed and arranged substantially as and for the purpose set forth.

CHARLES C. REDMOND.

Witnesses:
J. N. SPENCER,
H. H. RHODES.